United States Patent [19]
Kondou et al.

[11] Patent Number: 5,218,383
[45] Date of Patent: Jun. 8, 1993

[54] IMAGE FORMING APPARATUS EMPLOYING LED HEAD

[75] Inventors: Akihiro Kondou, Izumi; Akihiro Takada, Sayama, both of Japan

[73] Assignee: Mita Industrial Co., Ltd., Osaka, Japan

[21] Appl. No.: 764,703

[22] Filed: Sep. 24, 1991

[30] Foreign Application Priority Data

Oct. 2, 1990 [JP] Japan .................. 2-265512

[51] Int. Cl.⁵ ...................... G03G 15/04; G01D 15/14
[52] U.S. Cl. ........................... 346/160; 355/229; 362/418; 362/800
[58] Field of Search .............. 355/1, 229; 346/139 R, 346/155, 160; 362/382, 429, 418, 800

[56] References Cited
U.S. PATENT DOCUMENTS 4,602,262 7/1986 Milligan et al. .............. 346/160
4,703,334 10/1987 Mochimaru et al. .......... 346/160
4,728,981 3/1988 Koek et al. ..................... 355/1
4,821,051 4/1989 Hediger ......................... 346/155
4,875,057 10/1989 Hediger et al. ............... 346/160 X
4,905,028 2/1990 Okubo et al. .................. 346/160
4,928,139 5/1990 Barton et al. .................. 355/1

Primary Examiner—Fred L. Braun
Attorney, Agent, or Firm—Beveridge, DeGrandi, Weilacher & Young

[57] ABSTRACT

An image forming apparatus is described which includes a photoreceptor drum; an LED head for exposure provided along the width of the photoreceptor drum; a pin provided on the LED head; a supporting base substance to which the photoreceptor drum is attached; and a pin admitting groove provided on the supporting base substance for admitting the pin. The LED head is half-fixed on the supporting base substance.

11 Claims, 5 Drawing Sheets

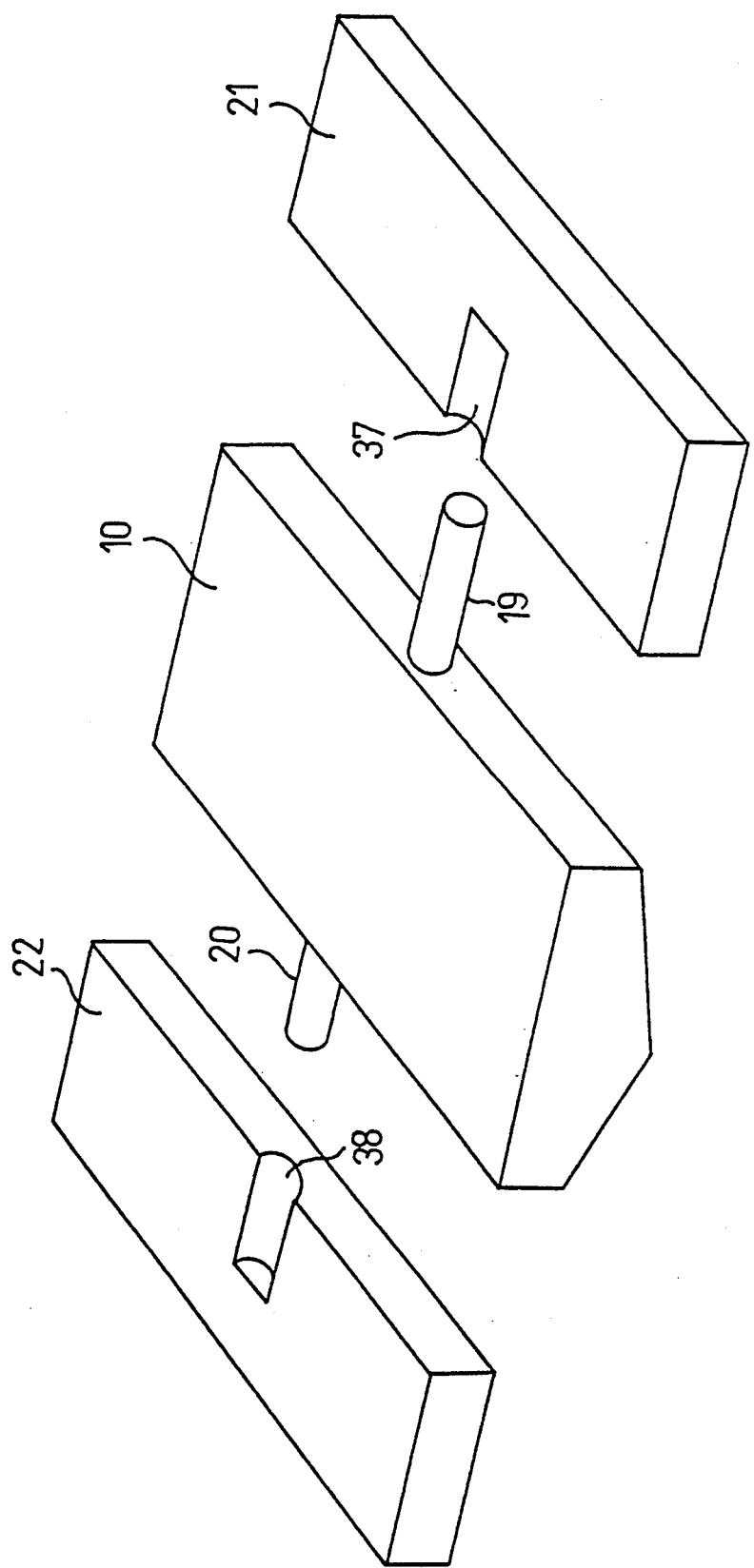

IMAGE FORMING APPARATUS EMPLOYING LED HEAD

BACKGROUND OF THE INVENTION

1. Field of the Invention

The present invention relates to an image forming apparatus employing an LED (light emitting diode). More particularly, the present invention relates to an image forming apparatus such as a digital electrophotographic copying machine, a printer, etc.

2. Description of the Prior Art

For digital image forming apparatuses, an LED head is frequently used as exposure means for writing an image onto the photoreceptor surface which has already been charged. The LED head has a structure where pairs consisting of an LED device and SELFOC lens are linearly arranged in a direction parallel to the axis of a photoreceptor drum (that is, in a direction along the width of the photoreceptor drum). The number of pairs corresponds to the number of picture elements in the direction. Although the LED head is arranged in a direction along the axis of the photoreceptor drum as described above, the arrangement position of the LED head sometimes shifts with respect to the direction along the width of the photoreceptor because of a thermal expansion of the whole LED head caused by a light emission of the LED device. This means that a formed image is shifted from an intended position corresponding to an original, which shift is undesirable. However, in a conventional image forming apparatus for paper of smaller size, since the number of LED devices and the thermal expansion are small so that hardly any problems are caused, both ends of the LED head are fixed along the width of the photoreceptor on a supporting base substance to which the photoreceptor is attached.

In an image forming apparatus for paper of larger size, since a greater number of LED devices are required because of a large number of the picture elements, an expansion and contraction, in actual size, of the LED heads and the shift of a formed image from an intended position corresponding to an original due to the thermal expansion cannot be ignored, so that, for example, there are occasions when the center of the original and that of the formed image do not correspond.

SUMMARY OF THE INVENTION

An object of the present invention is to provide an image forming apparatus where the center of a shift of the LED heads with respect to the photoreceptor is maintained fixed to form a stable image.

According to the present invention, an image forming apparatus is provided with a photoreceptor, an LED head for exposure provided along the width of said photoreceptor, first fixing means provided on said LED head, a supporting base substance to which said photoreceptor is attached, second fixing means provided on said supporting base substance and on which said first fixing means is fixed, and half-supporting means which half-fixes said LED head on said supporting base substance.

With the above-described image forming apparatus according to the present invention, when a fixing position of the first and second fixing means is the center of the LED head, although the both ends of the LED heads freely expand and contract in a direction of the thermal expansion caused by a light emission of the LED device, the center never shifts with respect to the photoreceptor. Thus, the center of the shift is fixed even when a formed image is shifted from an original due to the thermal expansion of the LED heads, so that a stable image is formed.

BRIEF DESCRIPTION OF THE DRAWINGS

This and other objects and features of this invention will become clear from the following description taken in conjunction with the preferred embodiments with reference to the accompanied drawings in which:

FIG. 5 is a perspective view of the LED head and the stays.

BRIEF DESCRIPTION OF THE PREFERRED EMBODIMENTS

Figure 1:
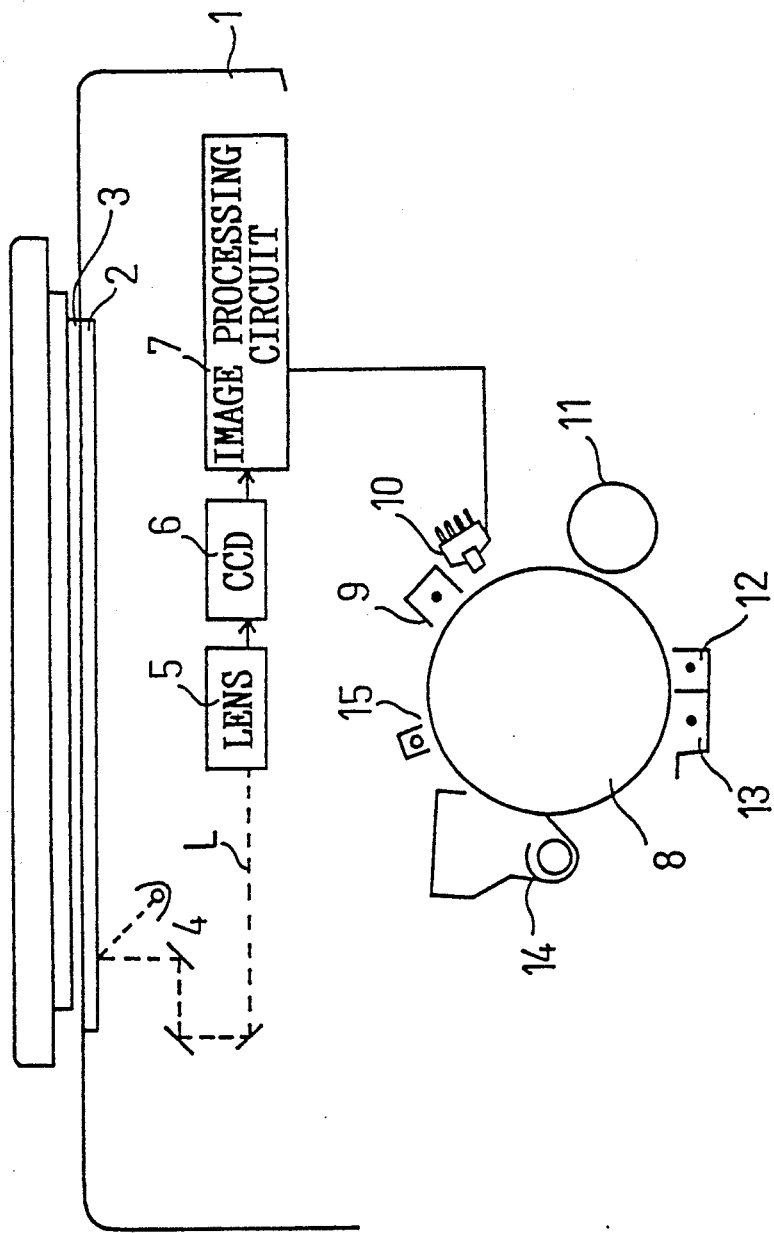
FIG. 1 is a schematic view of an electrophotographic copying machine in which the present invention is incorporated.

An embodiment of the present invention will hereinafter be described with reference to the drawings. FIG. 1 shows a main portion of a digital copying machine in which the present invention is incorporated. In the figure, an original 3 is placed on a contact glass 2 provided on the upper surface of a copying machine 1. A scanning optical system 4 is provided below the contact glass 2. The scanning optical system 4 moves from a home position shown in the figure toward the right while scanning the original, and turning around at a predetermined position, it returns to the home position. Light L from the optical system 4 is directed to a CCD (charge coupled device) 6 through an image forming lens 5. After being converted into an electric signal at the CCD 6, the light information is processed as image data at an image processing circuit 7. An output of the image processing circuit 7 is directed to an LED head 10 for exposure to expose the surface of a photoreceptor drum 8. A charging portion 9, the LED head 10 for exposure, a developing roller 11, a transferring portion 12, a separating portion 13, a cleaning portion 14 and a charge removing portion 15 are provided on the periphery of the photoreceptor drum 8 in the order named along a rotation direction thereof.

The charging portion 9 charges the surface of the photoreceptor drum 8 so that its potential is approximately 700 V. The LED head 10 forms a latent image on the surface of the photoreceptor drum 8 by exposing the charged surface of the photoreceptor drum 8 based on the above-described image information. The developing roller 11, which constitutes a part of the developing apparatus, provides toner onto the surface of the photoreceptor drum 8 and develops the latent image formed on the surface of the photoreceptor drum 8. The transferring portion 12 transfers the image on the surface of the photoreceptor drum 8 onto a sheet of paper provided by a paper feeder (not shown) so as to contact the surface of the photoreceptor 8. The separating portion 13 separates the sheet of paper on which an image is transferred from the surface of the photoreceptor drum 8 and directs it to a conveying path leading to a fixing portion (not shown).

Figure 2:
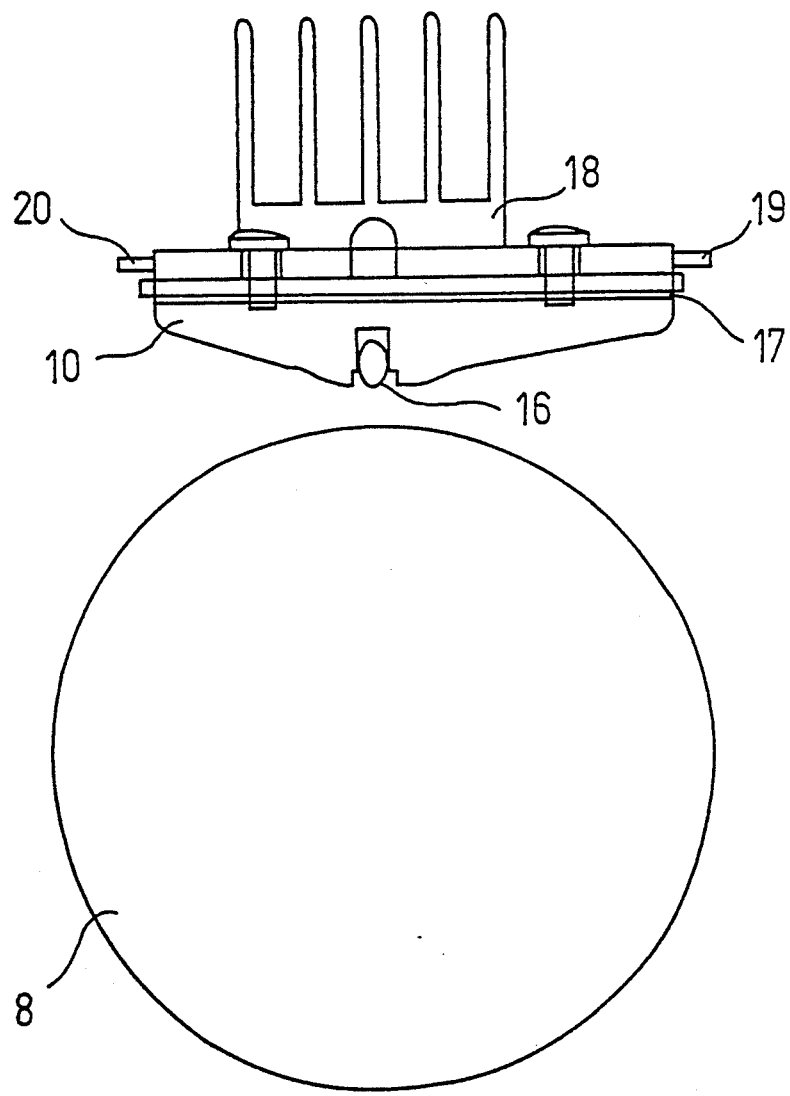
FIG. 2 is an enlarged view of a photoreceptor drum and an LED head.

FIG. 2 is an enlarged view of the photoreceptor drum 8 and the LED head 10. In the figure, the numeral 16 represents an optical system where zooming is not performed such as a SELFOC lens, etc., the numeral 17 represents a substrate where the LED device is attached, and the numeral 18 represents a heat radiating plate serving as a heat sink and made of aluminum. The optical system 16 and the LED device make a pair. Many such pairs are arranged in an array in a direction perpendicular to the surface of FIG. 2 (that is, a direction along the axis of the photoreceptor drum 8). The numerals 19 and 20 represent pins attached to the LED head 10, and they are engaged with pin admitting grooves 37 and 38 of stays 21 and 22 to be subsequently described (see FIG. 5).

Figure 3:
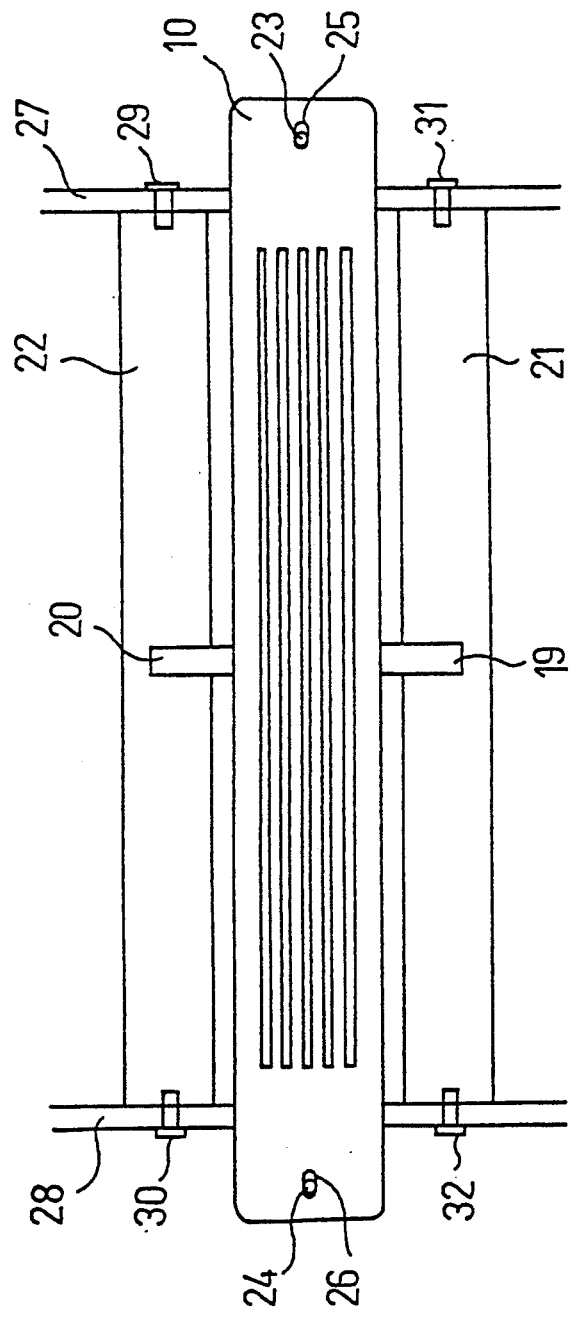
FIG. 3 is a view showing a condition of an engagement of the LED head and stays.
Figure 4:
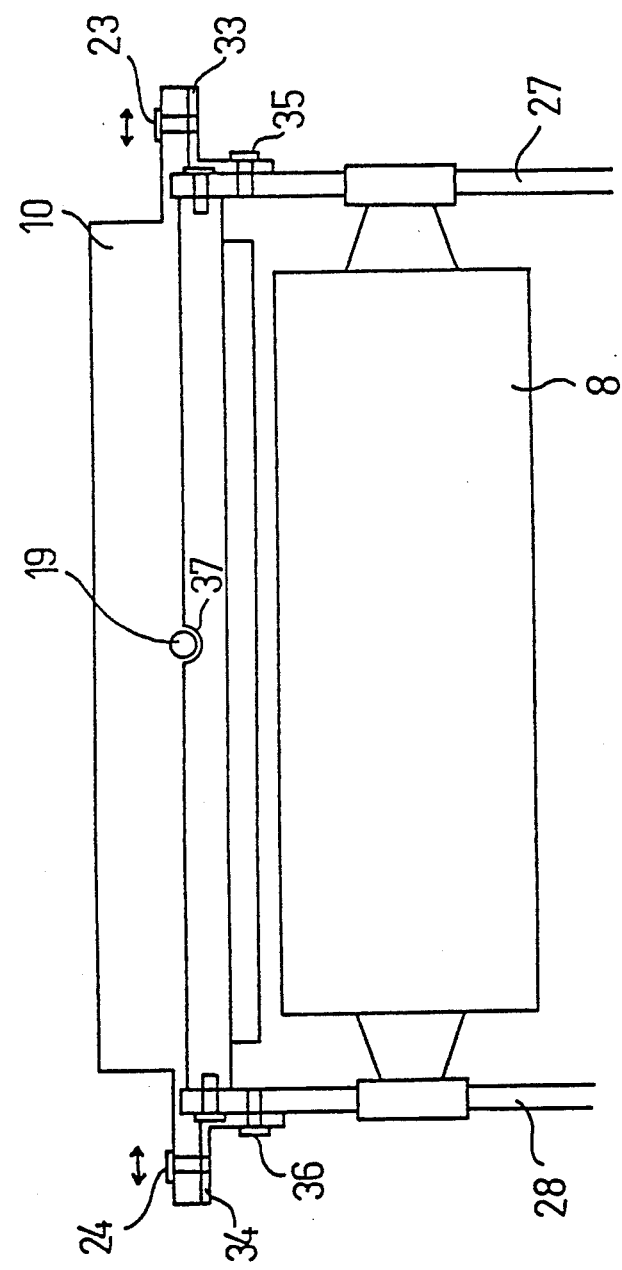
FIG. 4 is a cross-sectional view thereof.

FIG. 3 is a plan view showing a condition of an engagement of the LED head and the stays 21 and 22. FIG. 4 is a a cross-sectional view taken on a part thereof. In this embodiment, an engagement position of the LED head 10 and the stays 21 and 22 is the center of the LED head 10, that is, the center of the photoreceptor drum 8 along the axis thereof. The stays 21 and 22 are fixed with screws 29, 30, 31 and 32 on side plates 27 and 28 on which the photoreceptor drum 8 is fixed. As shown in FIG. 5, the pin admitting grooves 37 and 38 for admitting the pins 19 and 20 provided on the LED head are formed on the stays 21 and 22. Both ends of the LED head are fixed with pins 23 and 24 through elliptic holes 25 and 26 on L-shaped fixing plates 33 and 34 fixed on the side plates 27 and 28 with screws 35 and 36.

In the above structure, the LED head 10 is heated by the turning on of the LED device thereof and is expanded when the heat is high. Relating an expansion in a lateral direction in FIGS. 3 and 4, since a correspondence of the center of the LED head and the centers of the stays 21 and 22 is maintained by the engagement of the pins 19 and 20 of the LED head 10 and the pin admitting grooves 37 and 38 of the stays 21 and 22, the center of the LED head 10 never shifts with respect to the center of the photoreceptor drum 8. Thus, an image formed on transferring paper (not shown) through the photoreceptor drum 8 is relatively clear, since the image, although shifted on both sides, is not shifted in the center (that is, the center of the shift is fixed). In this embodiment, the positions of the center of the LED head 10 and the centers of the stays 21 and 22 correspond, and the positions of both sides of the LED head and both sides of the stays 21 and 22 shift. The shift becomes permittable by moving the pins 23 and 24 in the elliptic holes 25 and 26.

Although the pins 19 and 20 are provided on the LED head 10, and the pin admitting grooves 37 and 38 are formed on the stays 21 and 22 in this embodiment, it may be possible to provide the pins on the stays 21 and 22 and to form the grooves on the LED head.

Moreover, although the engagement position of the LED head 10 and the stays 21 and 22 is the center of the LED head so that the center corresponds the center of an original in this embodiment, it may be possible, for example, to provide the pins 19 and 20 and the pin admitting grooves 37 and 38 on one end of the LED head and one end of each of the stays 21 and 22, respectively, so that the engagement position corresponds to one end of an original. The above one-end engagement can also be realized by, without providing any of the pins 19 and 20, the stays 21 and 22 and the pin admitting grooves 37 and 38, fixing one end of the LED head 10 and half-fixing the other end on the fixing plates 33 and 34 through either of the elliptic holes 25 and 26.

Obviously, many modifications and variations of the present invention are possible in light of the above teachings. It is therefore to be understood that within the scope of the appended claims, the invention may be practiced other than as specifically described.

What is claimed is:

1. An image forming apparatus comprising:
    a photoreceptor;
    an LED head for exposure provided along a width of said photoreceptor;
    first fixing means provided on said LED head;
    a supporting base substance to which said photoreceptor is attached;
    second fixing means provided on said supporting base substance and on which said first fixing means is fixed; and
    half-supporting means which half-fixes said LED head on said supporting base substance, such that said half-supporting means allows for thermal expansion and contraction of said LED head.

2. An image forming apparatus according to claim 1, wherein said second fixing means comprises a stay attached to said supporting base substance.

3. An image forming apparatus according to claim 1, wherein a fixing position of said first and second fixing means corresponds to the center of said photoreceptor.

4. An image forming apparatus according to claim 1, wherein said image forming apparatus is an electrophotographic copying machine.

5. An image forming apparatus according to claim 1, wherein said first fixing means is a pin and said second fixing means is a pin admitting groove.

6. An image forming apparatus comprising:
    a photoreceptor;
    an LED head for exposing the photoreceptor, the LED head provided along a width of the photoreceptor;
    first fixing means provided on the LED head;
    a supporting base to which the photoreceptor is attached;
    second fixing means provided on the supporting base and onto which the first fixing means is attached; and
    half-supporting means which half-fixes the LED head on the supporting base, the half-supporting means including a first pin located at a first end of the LED head, the first pin movably received in a first elliptical hole in the LED head, and the half-supporting means further including a second pin located at a second end of the LED head, the second pin movably received in a second elliptical hole in the LED head, whereby the first pin and the second pin, and the first elliptical hole and the second elliptical hole are arranged so as to allow for the thermal expansion and contraction of the LED head.

7. An image forming apparatus according to claim 6, wherein the second fixing means includes a stay attached to the supporting base.

8. An image forming apparatus according to claim 6, wherein the first fixing means and the second fixing means are fixed together at a position which corresponds to a center of the width of the photoreceptor.

9. An image forming apparatus according to claim 6, wherein the image forming apparatus is an electrophotographic copying machine.

10. An image forming apparatus according to claim 6, wherein the first fixing means is a pin and the second fixing means is a pin admitting groove.

11. An image forming apparatus comprising:

a photoreceptor;

an LED head for exposing the photoreceptor, the LED head being provided along a width of the photoreceptor;

first fixing means provided on the LED head, wherein the first fixing means includes a pin;

a supporting base to which the photoreceptor is attached;

second fixing means provided on the supporting base and onto which the first fixing means is attached, wherein the second fixing means includes a pin admitting groove, and wherein the first fixing means and the second fixing means are attached together at a position which corresponds to a center of the width of the photoreceptor; and half-supporting means which half-fixes the LED head on the supporting base, the half-supporting means including a first pin located at a first end of the LED head, the first pin movably received in a first elliptical hole in the LED head, and the half-supporting means further including a second pin located at a second end of the LED head, the second pin movably received in a second elliptical hole in the LED head, whereby the first pin and the second pin, and the first elliptical hole and the second elliptical hole are arranged so as to allow for the thermal expansion and contraction of the LED head, and so as to maintain the position of the center of the LED head with respect to the photoreceptor.

* * * * *